United States Patent
De Jong

(10) Patent No.: US 7,645,128 B2
(45) Date of Patent: Jan. 12, 2010

(54) DIVIDING DEVICE

(75) Inventor: Pieter De Jong, 'T Harde (NL)

(73) Assignee: De Jong Engineering Elburg B.V., Elburg (NL)

( * ) Notice: Subject to any disclaimer, the term of this patent is extended or adjusted under 35 U.S.C. 154(b) by 0 days.

(21) Appl. No.: 10/542,898

(22) PCT Filed: Jan. 20, 2003

(86) PCT No.: PCT/NL03/00040

§ 371 (c)(1),
(2), (4) Date: Feb. 21, 2006

(87) PCT Pub. No.: WO2004/064992

PCT Pub. Date: Aug. 5, 2004

(65) Prior Publication Data

US 2006/0137536 A1 Jun. 29, 2006

(51) Int. Cl.
*F04C 2/00* (2006.01)
*F04C 23/00* (2006.01)

(52) U.S. Cl. ........................ 418/13; 418/15; 418/253; 418/255; 222/134; 222/135

(58) Field of Classification Search ................ 418/13, 418/209, 253–257, 15; 222/134, 135
See application file for complete search history.

(56) References Cited

U.S. PATENT DOCUMENTS

| | | | |
|---|---|---|---|
| 4,622,717 A | 11/1986 | Bollinger | |
| 4,747,767 A | 5/1988 | Schnell | |
| 5,037,283 A * | 8/1991 | Kapur et al. | ............... 418/255 |
| 5,102,314 A | 4/1992 | Staudenrausch | |
| 5,688,540 A | 11/1997 | Hannaford | |
| 5,906,297 A * | 5/1999 | Cole | ......................... 222/134 |
| 7,037,093 B2 * | 5/2006 | Jong | ......................... 418/255 |
| 7,048,525 B2 * | 5/2006 | Brick et al. | ............... 418/209 |

FOREIGN PATENT DOCUMENTS

| | | |
|---|---|---|
| FR | 640876 A | 4/1928 |
| WO | WO 98/22206 | 5/1998 |
| WO | WO 02/062459 A1 | 8/2002 |

* cited by examiner

*Primary Examiner*—Theresa Trieu
(74) *Attorney, Agent, or Firm*—The Webb Law Firm

(57) ABSTRACT

The invention relates to a dividing device, comprising an outer housing with an inlet and at least two outlets, at least two pump chambers placed adjacently of each other in the outer housing, each with a pump chamber infeed connected to the inlet and each with a pump chamber discharge connected to the outlet, at least two vane-type rotors, one in each pump chamber and with a rotation axis in line, each vane-type rotor comprising a hub provided with continuous vanes which are slidable through the hub along their longitudinal axis and almost perpendicularly of the axis of the hub, wherein the outer housing is divided into outer housing segments.

10 Claims, 9 Drawing Sheets

DIVIDING DEVICE

BACKGROUND OF THE INVENTION

1) Field of the Invention

The invention relates to a dividing device.

2) Description of the Prior Art

It is common practice to supply a flow of material, preferably dough material or minced meat or stuffing for croquettes and the like, to a dividing device by means of a vacuum fill machine. As the vacuum fill machine is an expensive machine, it is preferred to provide the vacuum fill machine with a dividing device, wherein the flow of material is first divided into various flows which are as similar as possible and which are subsequently divided into portions dependently or independently of each other. It is desirable here that the size and weight of the portions are repeated as accurately as possible. In many production situations it is desirable to keep the standard deviation between the portions as small as possible.

Known from for instance WO-A2-98/22206 is a dividing device provided with a device for converting one flow of material into a plurality of flows, wherein the device is provided with a vane-type rotor. A drawback of the described embodiments however is that very large standard deviation was found to occur in the size of the flows and therefore the portions, particularly in the case of viscous materials. In addition, the number of flows from such a machine cannot be increased. A machine which for instance converts one flow into four flows cannot be enlarged into a machine converting one flow into six flows. The only possibility is to place an additional dividing device, wherein the infeed flow is first separated into two flows and shared over two identical dividing devices. It is virtually impossible to meet the requirements of a customer in respect of the number of output flows. After all, a manufacturer cannot stock all different embodiments with a different number of output flows. These embodiments must therefore be made specially on demand for a customer, whereby the dividing device is expensive to manufacture.

WO-A2-98/22206 has gone part-way in attempting to deal with this drawback by dividing the internal mechanism, i.e. the pump chambers and the vane-type rotors, into almost identical segments, one segment for each outgoing flow. The outer housing is however in one piece and cannot be modified.

SUMMARY OF THE INVENTION

The invention has for its object to obviate the stated drawbacks. To this end the invention relates to a dividing device, comprising:

an outer housing with an inlet and at least two outlets;

at least two pump chambers placed adjacently of each other in the outer housing, each with a pump chamber infeed connected to the inlet and each with a pump chamber discharge connected to the outlet;

at least two vane-type rotors, one in each pump chamber and with a rotation axis in line, each vane-type rotor comprising a hub provided with continuous vanes which are slidable through the hub along their longitudinal axis and almost perpendicularly of the axis of the hub, wherein the outer housing is divided into outer housing segments.

The use of an outer housing in segments allows modification of the dividing device at a later stage. In addition, a flexible delivery program can be offered to a customer.

In one embodiment each outer housing segment comprises at least one inlet opening and at least one outlet opening. An existing dividing device can hereby be enlarged in simple manner.

In a further embodiment each outer housing segment comprises one pump chamber.

In a further embodiment of a dividing device according to the invention, the outer housing segments are identical.

In a further embodiment each outer housing segment comprises an inlet and an outlet.

In a further embodiment the outer housing segments are enclosed between closed end parts.

In an embodiment the outer housing segments are in parallel arrangement.

In an embodiment the vane-type rotors form a vane-type rotor assembly.

In a further embodiment each outer housing segment is provided with a cylinder running through the outer housing segment and having a longitudinal axis practically parallel to the rotation axis of the vane-type rotor assembly, wherein the pump chambers are held in the cylinder. In a particular embodiment hereof, the cylinder is a circular cylinder.

In one embodiment the cylinder runs continuously through the segments.

In one embodiment the outer housing segments are mirror-symmetrical relative to a plane of symmetry perpendicularly of the longitudinal axis of the cylinder.

In a further embodiment of the dividing device according to the invention, each outer housing segment comprises one pump chamber, wherein each pump chamber extends into a subsequent segment. The connecting seams of the outer housing segments and the pump chambers are hereby offset relative to each other. A better sealing is hereby obtained.

In an embodiment hereof, the outer housing segments are cylindrical with end surfaces, and form together with the end surfaces on each other a cylindrical outer housing, and the pump chambers are each cylindrical with end surfaces, and connecting together form a cylinder in the outer housing, wherein the end surfaces of the pump chambers are offset relative to the end surfaces of the outer housing segments.

In a further embodiment the pump chambers are closed on one end surface and open on the other side, wherein a pump chamber is arranged with its closed end surface toward the open end surface of a subsequent pump chamber.

In a further embodiment the vane-type rotor forms a part of the closure of the closed end surface.

In addition, the application relates to an outer housing segment evidently suitable for a device as described above in the text.

If desired, the stated aspects of the invention can be combined.

BRIEF DESCRIPTION OF THE DRAWINGS

The invention will be further elucidated on the basis of an exemplary embodiment of a dividing device according to the invention, in which.

DETAILED DESCRIPTION OF THE INVENTION

Figure 1:
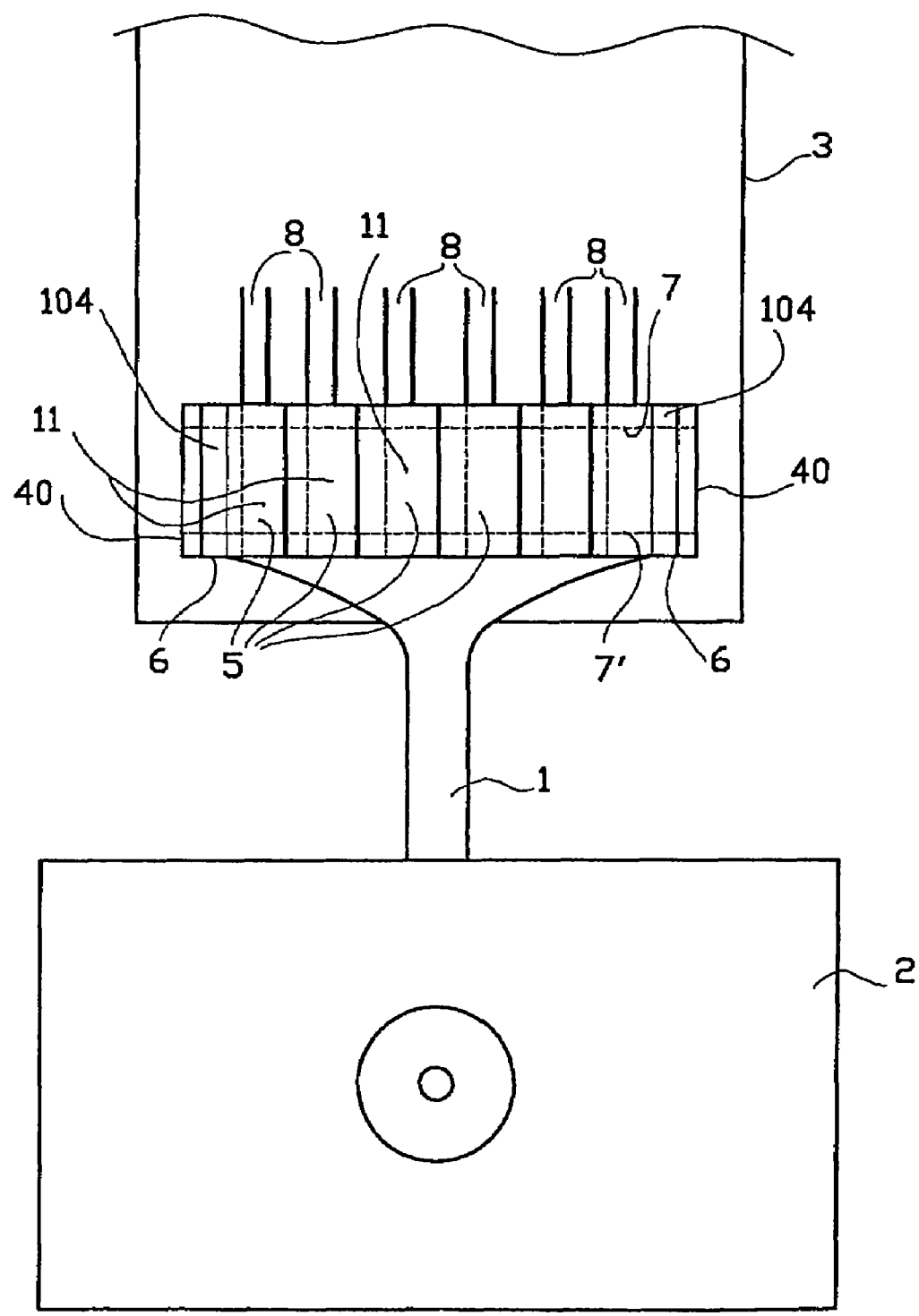
FIG. 1 shows a dividing device according to the invention.

FIG. 1 shows a device for processing meat dough, among other materials, provided with a dividing device according to the invention connected to a vacuum fill machine 2. The dividing device is provided with an inlet manifold 1 connected to further inlet openings of the dividing device, and a discharge device 3 for discharging the various flows of material coming out of the outlet openings 8 of the dividing device. The dividing device is provided with an outer housing 4 divided into outer housing segments 5 and end segments 6. The outer housing segments and end segments are enclosed between end parts 40 and held together by means of enclosing means 7, 7'. Accommodated in the outer housing is the internal mechanism 10 (FIG. 2) with internal mechanism end parts 104 and 104' for closing purposes. The internal mechanism is built up of pump chambers 11 with the internal mechanism end parts 104, 104' on both ends.

The outer housing segments are parallel to the inlet of the dividing device, i.e. adjacent each other. This in contrast to serial, i.e. behind or following one another.

Figure 2:
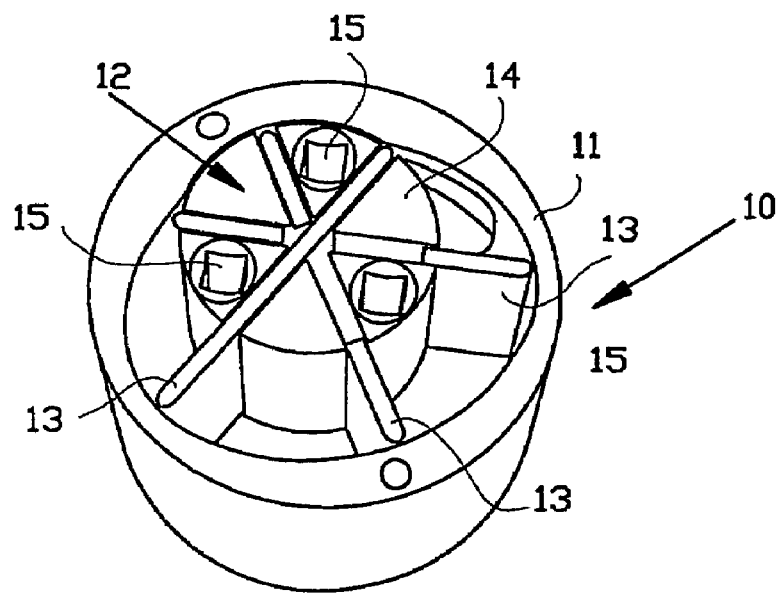
FIG. 2 shows a segment of the pump chamber with vane-type rotor.

FIG. 2 shows an internal mechanism part 10 comprising a pump chamber 11 and a vane-type rotor 12 of the dividing device as shown in FIG. 1. Placed adjacently of each other, the internal mechanism parts with end parts form the internal mechanism.

As shown in FIG. 1, each outer housing segment 5 is provided with such a pump chamber 11 in which a vane-type rotor 12. The vane-type rotor 12 is provided with vanes 13 that are movable in a hub 14 longitudinally relative to the axis of rotation R of the vane-type rotor. The hub is preferably provided with non-round apertures 15.

Figure 3:
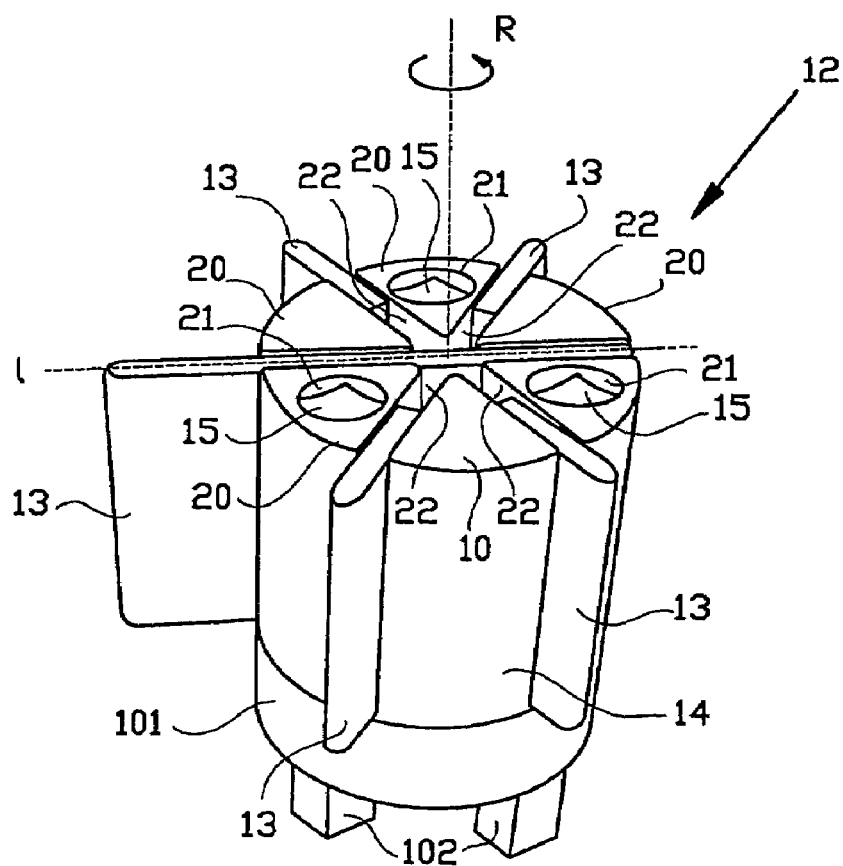
FIGS. 3 and 3A-3C show a vane-type rotor.

FIG. 3 shows vane-type rotor 12 in detail. In the figure it can clearly be seen that the vane-type rotor 12 comprises a hub 14 provided with axial grooves 22 which partially divide the hub into sections 20. A part of the sections 20 is here provided with non-round apertures 15 provided with a flat surface 21. In this exemplary embodiment the apertures are given a square form. Vanes 13 can move longitudinally (indicated with 1) in the axial grooves. The hub itself is mounted in the pump chamber for rotation about rotation axis R. The vanes are generally made of metal, preferably stainless steel. The hub itself is usually of plastic, for instance nylon.

Figure 3A:
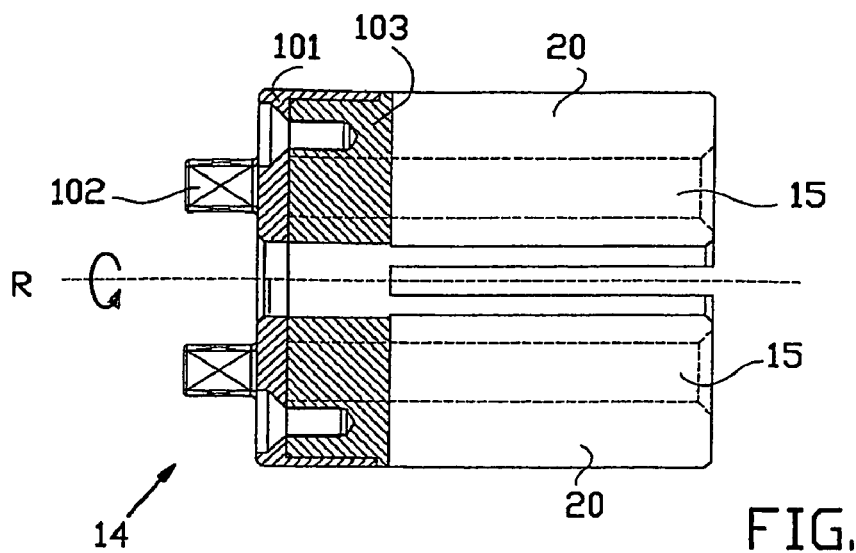
Figure 3B:
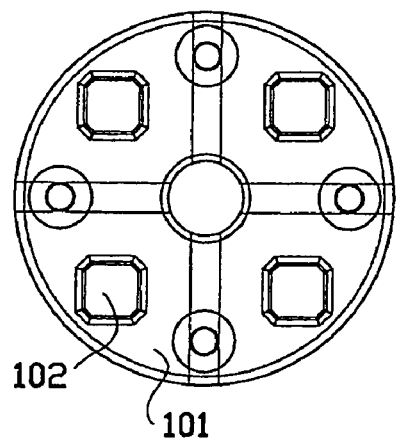
Figure 3C:
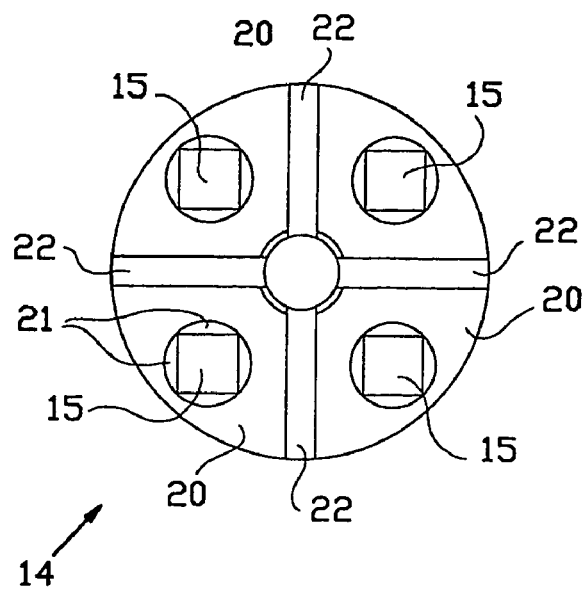

The hubs 14 can be placed onto each other. Each hub is provided with pin-shaped protrusions which extend into the apertures of a following hub to functionally form one continuous hub. Connecting elements, such as bolts or pins, can also be inserted through apertures 15 to connect the various hubs to each other. The shape of the bolts is adjusted here to the cross-section of the apertures. The connecting elements preferably fit exactly into the apertures. However, the hubs are preferably connected to each other as described in WO 02/062459, for instance FIGS. 4, 6 and 7. Reference is made here to WO 02/062459 as if the text thereof were fully included in the description. FIGS. 3A-3C show an embodiment of the vane-type rotor 12 with a hub 14 with two sliding vanes 13 so that four compartments are formed. Each section 20 of hub 12 is provided with an aperture 15 into which a pin-shaped protrusion 102 extends in the mounted position of the dividing device, so that the hubs are rigidly connected. FIG. 3A shows even more clearly in cross-section that a plastic hub is provided with an attachment 101 (here of stainless steel) provided with pin-shaped protrusions 102 (here of square section). The cross-section of FIG. 3A is taken precisely along a vane, so that it can be seen that sections 20 in upper part 103 of hub 14 are mutually connected. FIG. 3B shows a view of the hub on this attachment 101. FIG. 3C shows a view of the hub on the opposite part, wherein the grooves 22 which partly divide the hub into sections 20 can be clearly seen.

Figure 4:
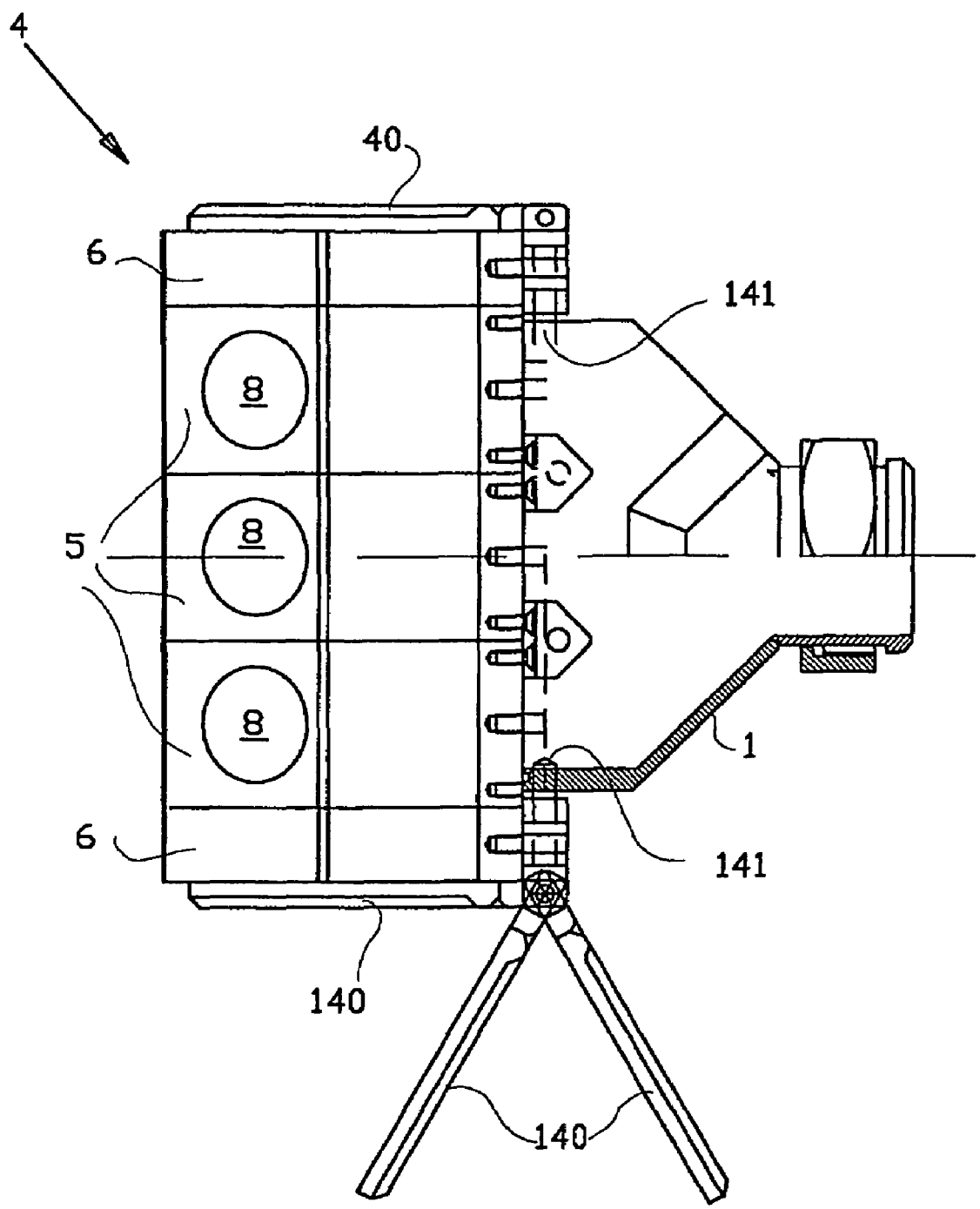
FIG. 4 shows a front view of a dividing device.

FIG. 4 shows a top view of an embodiment of the dividing device according to the invention. The dividing device here divides one incoming flow of material into three outgoing flows out of outlet openings 8. It is shown clearly here that the outer housing 4 is divided into housing segments 5, each having an outlet opening. If the dividing device must produce five instead of three flows, two additional segments 5 with pump chambers and rotors can be readily placed between the end parts 6, and a wider inlet manifold 1.

In this cross-section the end parts 40 of the outer housing cannot be seen. The dividing device is also provided with clamping means 140 for clamping inlet manifold 1 onto the dividing device. The handles hereof are shown in successive positions. Pins 141 can be activated by means of these handles. The pins fix the manifold with inlet opening 1 onto the dividing device.

Figure 5:
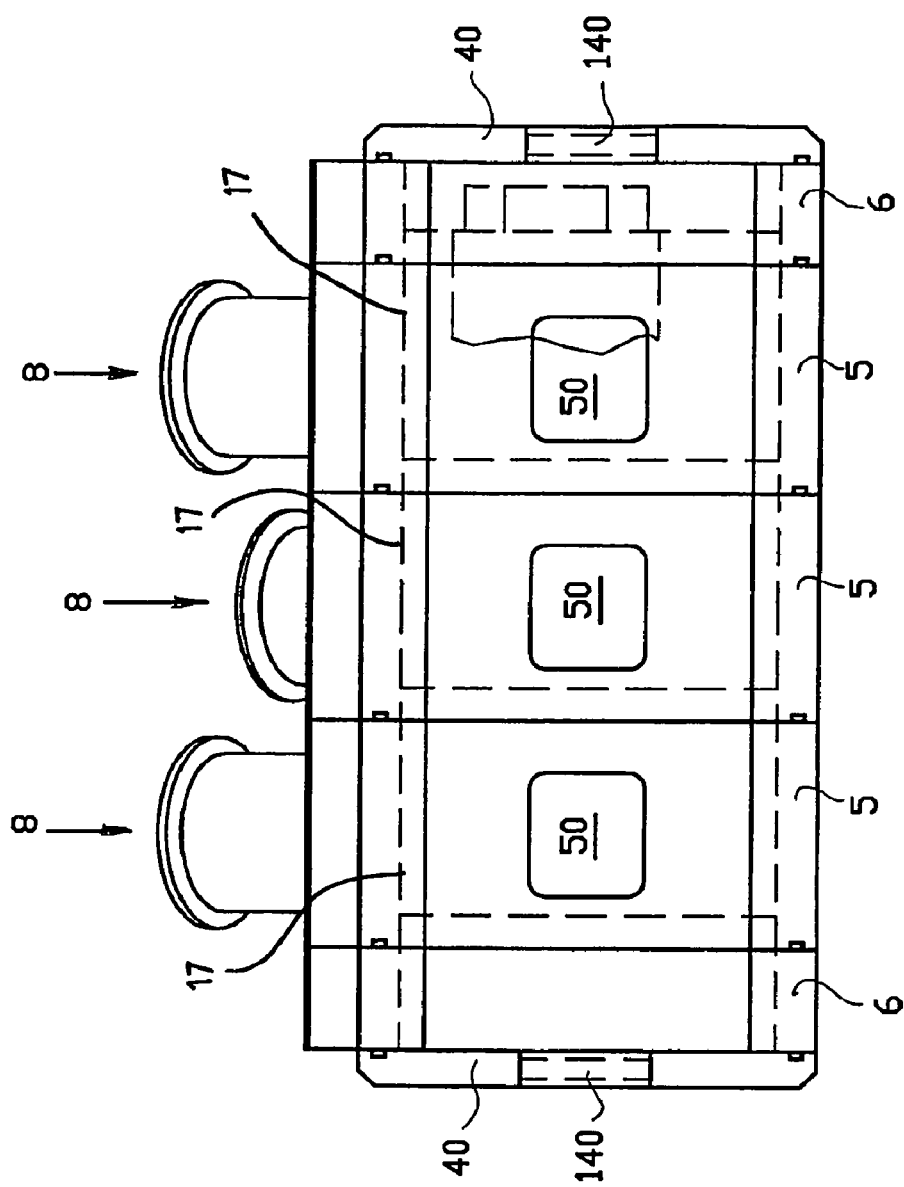
FIG. 5 shows a front view of a housing according to the invention.

FIG. 5 shows a front view of a dividing device where the inlet manifold is removed. Shown are inlets 50 of the dividing device. Each housing segment 5 is here provided with an inlet 50 and an outlet 8. Shown in broken lines are the pump chambers and a part of a hub 14 of a vane-type rotor with connecting pins 52. It can be seen how the handles of clamping means 140 for the manifold with inlet opening 1 are shown in broken lines in end parts 40 of the outer housing end parts and are recessed therein.

Figure 6:
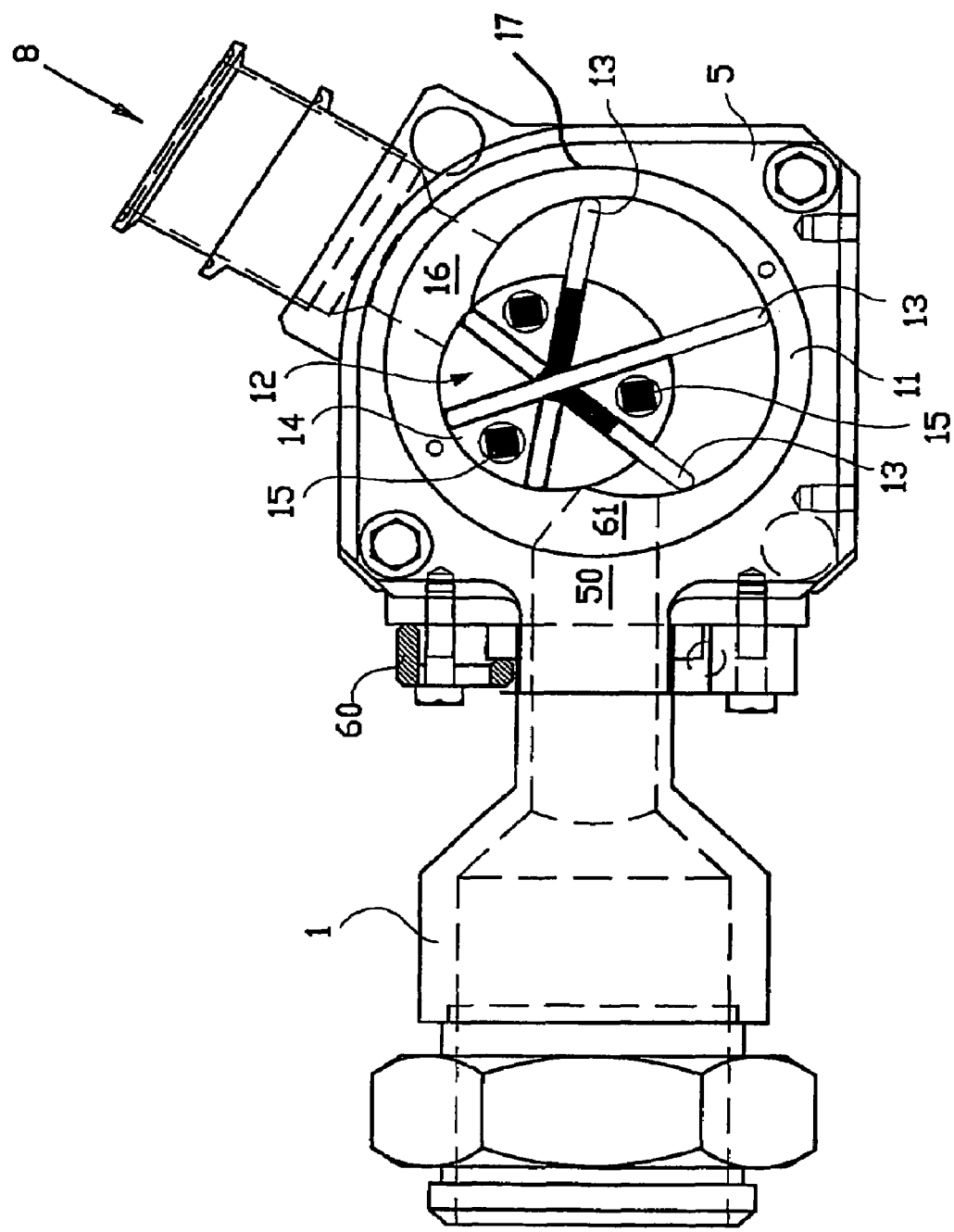
FIG. 6 shows a vertical section through the dividing device along a segment.

FIG. 6 shows a vertical section through a dividing device along a housing segment 5. In housing segment 5 can be seen a pump chamber 11 having therein a vane-type rotor 12 as described above.

The inlet 61 of pump chamber 11 is also shown in the figure.

In addition, alternative fastening means 60 for inlet manifold 1 are shown in this figure.

Figure 7:
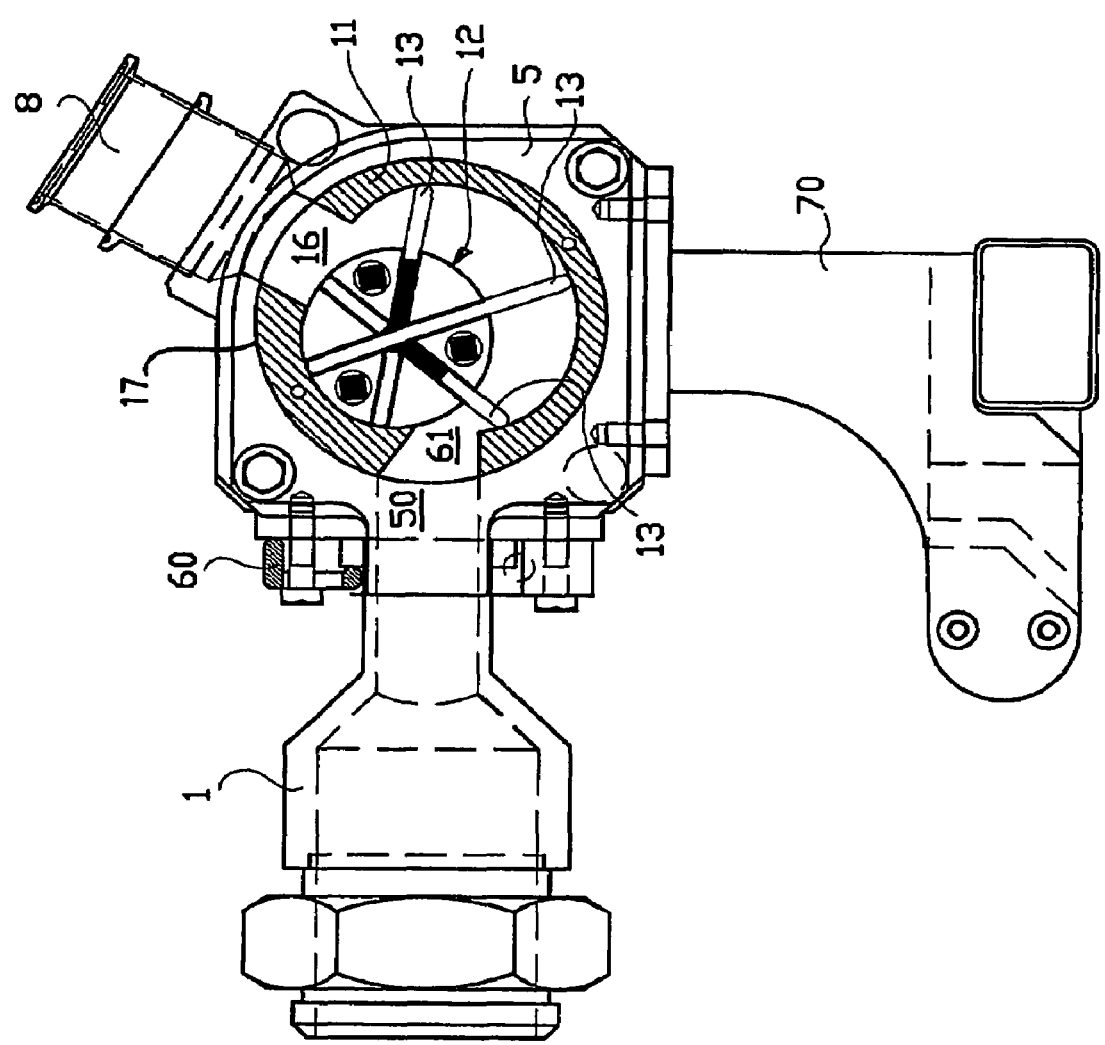
FIG. 7 shows a cross-section through a segment.

FIG. 7 likewise shows a vertical section through the dividing device of FIG. 6, now through a segment. Inlet 61 and outlet 16 of pump chamber 11 can clearly be seen here.

The dividing device can be held in position by means of support 70.

Figure 8:
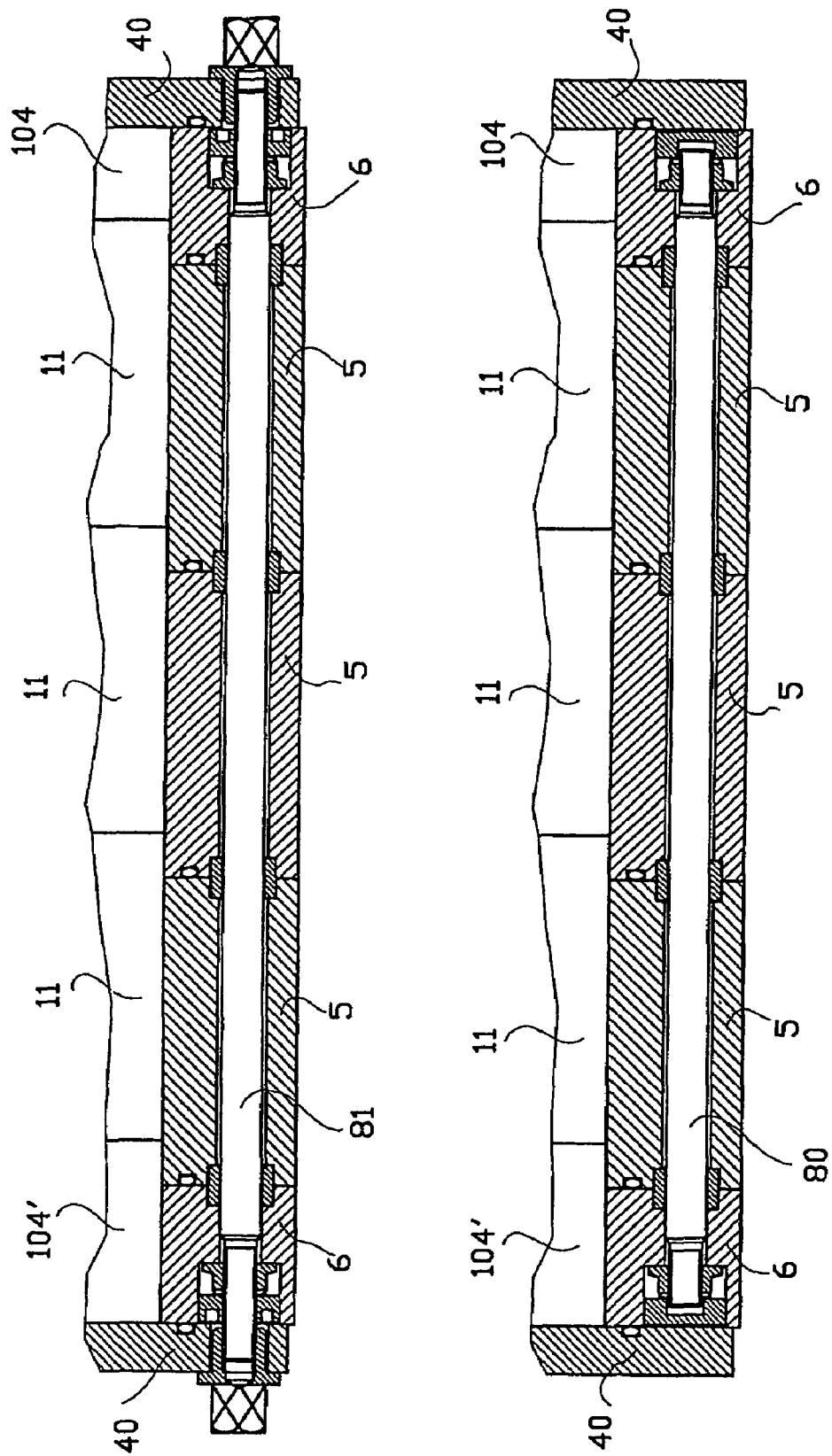
FIG. 8 shows a detail view of cross-sections showing enclosing means for holding together the outer housing segments.

FIG. 8 shows the means for holding together housing segments 5. The here identical housing segments and end segments 6 are provided here with two continuous holes running horizontally through the housing segments parallel to the axis of rotation of the vane-type rotors. A pull rod 80 and 81 runs through the continuous holes of the housing segments. The housing segments are closed on the outside by means of end parts 40.

The pull rods are provided here with bolts to pull the housing segments against each other between end parts 40.

Sealing rings are shown here between the housing segments. It has been found that, when the manufacture of the housing segments takes place accurately, rigid clamping together is sufficient to prevent leakage of meat dough.

Figure 9:
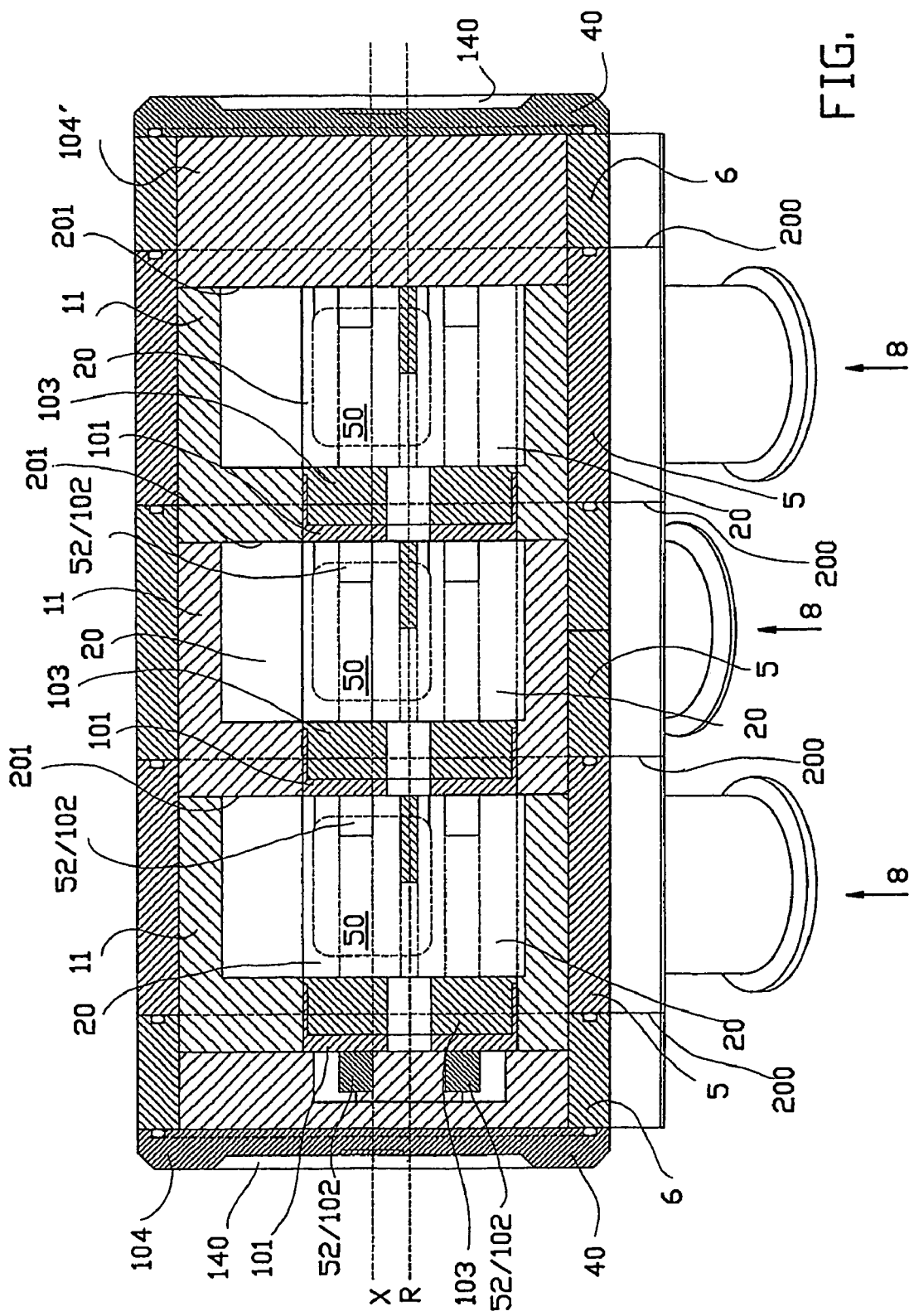
FIG. 9 shows a cross-section of the device of FIG. 5, with the components likewise in cross-section.

FIG. 9 shows a cross-section through all elements of the dividing device also shown in FIG. 5. It can clearly be seen here that pump chambers 11 are offset relative to segments 5, whereby a very good sealing is realized with a good fit of the pump chambers in the segments. Also shown is that internal mechanism end part 104 is provided with a recess for the pin-shaped protrusions 52/102 of the final hub. Internal mechanism end part 104' (on the right in the drawing) is closed in order to seal the first pump chamber. As in FIG. 3A, the section is taken along a vane of the vane-type rotor. It can clearly be seen that due to the modular structure of identical elements the dividing device, here with three outlets 8, can be readily enlarged to form still more outlets, wherein in each case an extra pump chamber with vane-type rotor and an outer housing segment can be arranged. Each pump chamber 11 is closed by the wall of the preceding pump chamber. End part 104' closes the final pump chamber. The end surfaces of segments 200 are offset in relation to the end surfaces of pump chambers 201.

The operation of the dividing device is as follows. Dough material is guided by a fill machine into the dividing device via at least one inlet opening. As a result of the often high pressure, up to more than 50 bar, the flow of dough sets the vane-type rotors into motion and the vane-type rotors start to rotate. A constant flow of dough is hereby ensured.

As the vane-type rotor rotates, the vanes move longitudinally and at a given moment during a revolution a vane will be wholly accommodated in the hub, and at a later moment will protrude maximally out of the hub.

Because the hubs are mutually connected, they will maintain the same rotation speed during operation and thereby result in an equal flow rate of material.

In another preferred and non-limiting embodiment, and as best illustrated in FIGS. 5-7, the dividing device includes a cylinder 17 running through each outer housing segment 5 and having a longitudinal axis practically parallel to the rotation axis of the vane-type rotor 12 assembly. The pump chambers 11 are held in the cylinder 17. In another embodiment, the cylinder 17 is a circular cylinder. In a further embodiment, the cylinder 17 runs continuously through the segments 5.

It will be apparent that the above description is only included to illustrate the operation of preferred embodiments and not to limit the scope of protection of the present invention. The scope of protection of the present invention is defined by the following claims. Variations and modifications of the embodiments set forth in the above description which are obvious to a skilled person also fall within the scope of protection of the present invention.

The invention claimed is:

1. A dividing device, comprising:
   a) an outer housing with an inlet and at least two outlets;
   b) at least two pump chambers placed adjacently of each other in the outer housing, each with a pump chamber infeed connected to the inlet and each with a pump chamber discharge connected to the outlet; and
   c) at least two vane-type rotors, one in each pump chamber and with a rotation axis in line, each vane-type rotor comprising a hub provided with continuous vanes which are slidable through the hub along their longitudinal axis and almost perpendicularly of the axis of the hub,
   wherein the outer housing is divided into outer housing segments and wherein each outer housing segment comprises one pump chamber, each said pump chamber extending into a subsequent segment so as to offset connecting seams of the outer housing segments relative to connecting seams of the pump chambers.

2. The dividing device as claimed in claim 1, wherein the outer housing segments are cylindrical with end surfaces, and form together with the end surfaces on each other a cylindrical outer housing, and the pump chambers are each cylindrical with end surfaces, and connecting together form a cylinder in the outer housing, wherein the end surfaces of the pump chambers are offset relative to the end surfaces of the outer housing segments.

3. The dividing device as claimed in claim 2, wherein the pump chambers are closed on one end surface and open on the other side, wherein the pump chambers are arranged with the closed end surface toward the open end surface of a subsequent pump chamber.

4. The dividing device as claimed in claim 3, wherein the vane-type rotor forms a part of the closure of the closed end surface.

5. The dividing device as claimed in claim 1, wherein each outer housing segment comprises at least one inlet opening and at least one outlet opening.

6. The dividing device as claimed in claim 1, wherein the outer housing segments are identical.

7. The dividing device as claimed in claim 1, wherein the outer housing segments are enclosed between closed end parts.

8. The dividing device as claimed in claim 1, wherein the vane-type rotors form a vane-type rotor assembly.

9. The dividing device as claimed in claim 1, wherein each outer housing segment is provided with a cylinder running through the outer housing segment and having a longitudinal axis practically parallel to the rotation axis of the vane-type rotor assembly, wherein the pump chambers are held in the cylinder.

10. The dividing device as claimed in claim 9, wherein the outer housing segments are mirror-symmetrical relative to a plane of symmetry perpendicularly of the longitudinal axis of the cylinder.

* * * * *

UNITED STATES PATENT AND TRADEMARK OFFICE
CERTIFICATE OF CORRECTION

PATENT NO. : 7,645,128 B2
APPLICATION NO. : 10/542898
DATED : January 12, 2010
INVENTOR(S) : Pieter De Jong It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 193 days.

Signed and Sealed this

Sixteenth Day of November, 2010

David J. Kappos
*Director of the United States Patent and Trademark Office*